C. H. STINSON.
STARTING CLUTCH MECHANISM.
APPLICATION FILED FEB. 26, 1916.
1,196,311.
Patented Aug. 29, 1916.
2 SHEETS—SHEET 1.
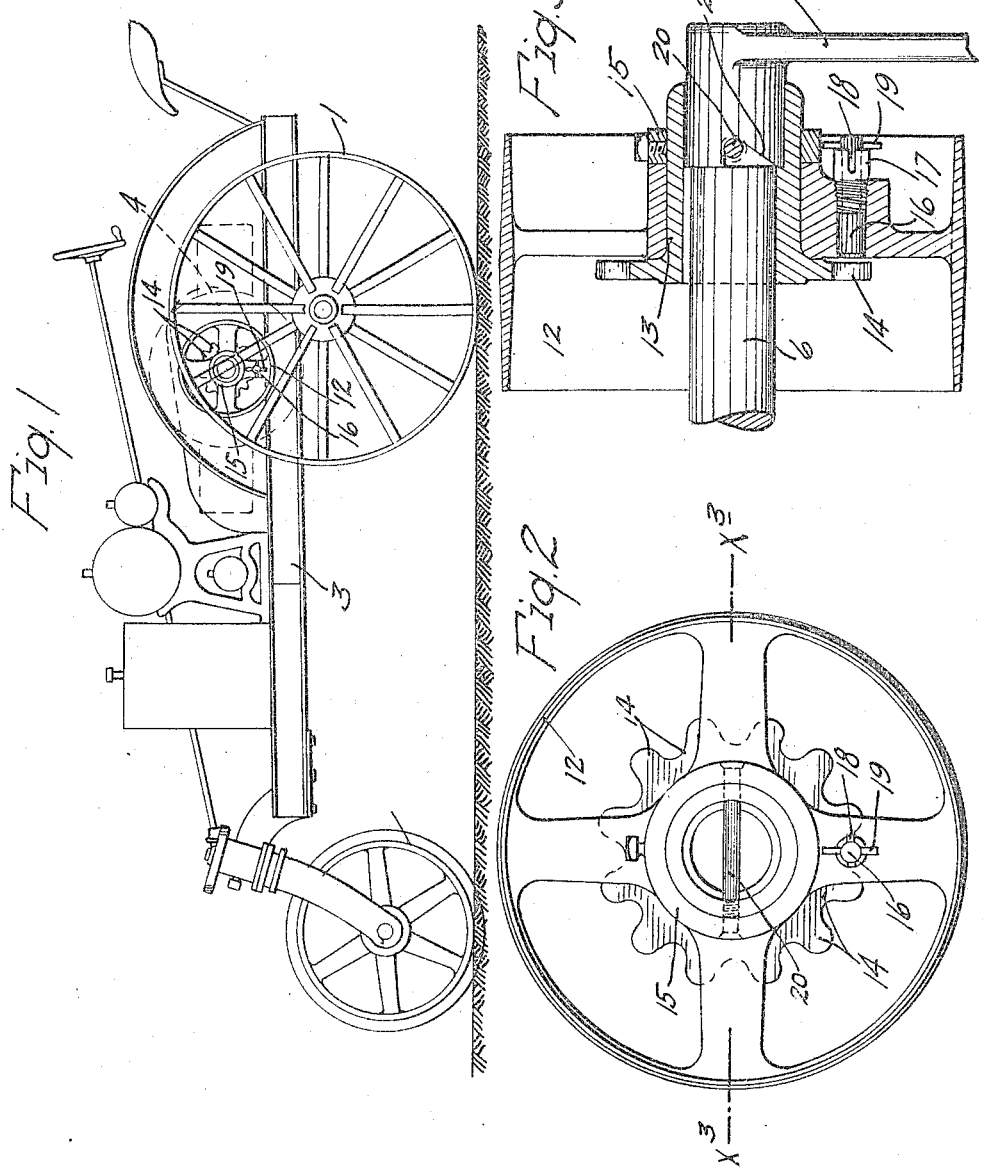
WITNESSES
E. C. Skinkle
A. H. Opsahl
INVENTOR
Charles H. Stinson
BY HIS ATTORNEYS
Williamson Merchant

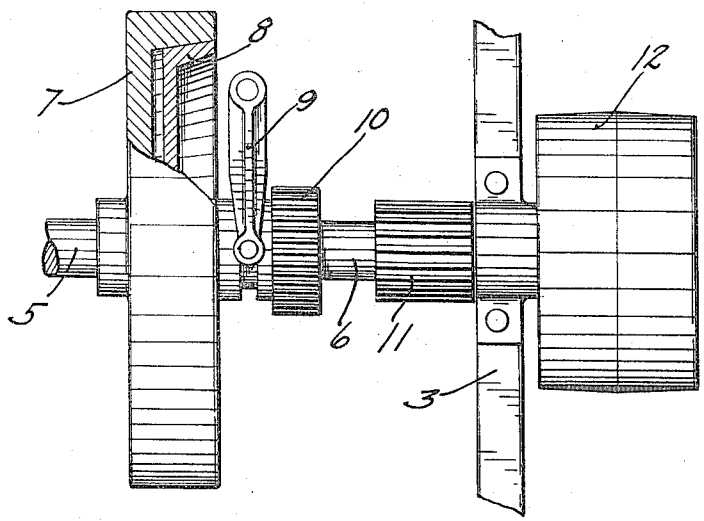

UNITED STATES PATENT OFFICE.

CHARLES H. STINSON, OF WATERTOWN, SOUTH DAKOTA.

STARTING-CLUTCH MECHANISM.

1,196,311.     Specification of Letters Patent.     Patented Aug. 29, 1916.

Application filed February 26, 1916. Serial No. 80,718.

*To all whom it may concern:*

Be it known that I, CHARLES H. STINSON, a citizen of the United States, residing at Watertown, in the county of Codington and State of South Dakota, have invented certain new and useful Improvements in Starting-Clutch Mechanism; and I do hereby declare the following to be a full, clear, and exact description of the invention, such as will enable others skilled in the art to which it appertains to make and use the same.

Particularly, my invention relates to tractors or motor propelled vehicles which are also used at times as stationary power plant. Tractors of this kind are driven by internal combustion or explosive engines which must be started by "cranking," and that the tractor may be used as a stationary plant, one of the engine driven shafts is provided with a pulley or equivalent form of driving wheel. In the customary arrangement, when the tractor is used as a stationary plant and the belt for the transmission of the power therefrom, is on the driving pulley, it is impossible to crank the engine without first throwing the belt off from the pulley. This belt is usually large and heavy and it is not an easy job either to throw the same off from the pulley or to apply the same thereto.

My invention provides an extremely simple and efficient clutch arrangement whereby the pulley can be made loose on the driving shaft while the engine is being cranked, then the driving pulley is positively connected to the driving shaft, through a suitable clutch or coupling, and thereafter, by closing a friction clutch, in the transmission, the pulley, with its belt and mechanism driven therefrom, may be gradually started until they have been given the full driving speed of the engine.

In the accompanying drawings which illustrate the invention, like characters indicate like parts throughout the several views.

Referring to the drawings: Figure 1 is a side elevation showing a tractor and illustrating my invention applied thereto; Fig. 2 is an end elevation of the driven shaft, pulley and clutch; Fig. 3 is a section taken on the line $x^3$ $x^3$ of Fig. 2, some parts being shown in full, and the starting crank being applied; and Fig. 4 is a plan view showing portions of the driving shaft, the driven shaft, and friction clutch and pulley.

Of the parts of the tractor, it is only desirable for the purposes of this case to briefly note the wheels 1 and 2, frame 3 and internal combustion engine 4, the latter of which has an extended crank shaft 5 herein designated as a driving shaft. This driving shaft 5 is axially alined with a driven shaft 6 journaled in suitable bearings on the frame 3 and adapted to be connected to the driving shaft 5 by coöperating friction clutch cone members 7 and 8. Any suitable form of friction clutch may be employed, but, as shown, the cone member 8 is arranged to be moved into and out of contact with the cone member 7 by a shipper lever 9 engaged with the grooved hub of the said member 8. The hub of the cone member 8 carries a spur gear 10 and the driven shaft 6 carries a spur gear 11. These spur gears 10 and 11 constitute part of the well known gear transmission between the engine driven shaft and the traction wheels, and the construction of which need not here be further considered.

A driving pulley 12, as shown, is directly journaled on a hub 13 that is keyed, or otherwise rigidly secured to the extended end of the driven shaft 6 and is provided, as shown, with a notched clutch flange 14. A collar 15 secured on the hub 13 holds the pulley against axial movements, but normally loose or free for rotation. Preferably, I provide a positive clutch or coupling for connecting the pulley to the driven shaft 6, at will, and as shown, this clutch comprises the notched flange 14, and a spring-pressed lock bolt 16 mounted in one of the spokes of the pulley 12 and engageable with any one of the notches of the said flange 14.

The numeral 17 indicates a small sleeve shown as screw-threaded into a large spoke of the pulley 12 and surrounding the outer portion of the lock bolt 16. The projecting end of this sleeve 17 has diametrically opposite notches 18, and the projecting end of the lock bolt 16 holds a diametrically projected pin 19 engageable therewith. When the pin 19 is seated in the notches 17, the lock bolts 16 will be engaged with the lock flange 14, but when the said pin is engaged with the outer edge of said sleeve, as shown in Fig. 3, the lock bolt will be secured against the tension of the plunger operating spring, and the said plunger will be held in its retracted position, with the pulley loose or with the driven shaft 6 free for rotation in respect to the pulley, as is required when the engine is to be cranked while the belt is on the pulley.

At its projected end, the driven shaft 6 is provided with means to which a starting crank may be applied to start the engine. As shown, this is accomplished by providing the front end of the hub 13 with a diametrically extended pin 20 and with a seat to receive the hub of the starting crank 21. The hub of this starting crank is provided with ratchet teeth 22 that are engageable with the pin 20 so as to rotate the shaft 6 in one direction, to-wit, in a direction to crank the engine. Of course, while starting or cranking the engine with the belt on the pulley 12, the said pulley must be free, as stated, and the shaft 6 must be connected to the shaft 5 by the clutch 7—8. Then when the clutch 7—8 is opened, the lock bolt 16 may be engaged with the lock flange 14, to thereby clutch the pulley to the shaft 6. Then, by closing the clutch 7—8, the pulley and the belt and the mechanism driven thereby may, as already stated, be gradually set in motion.

What I claim is:

1. In a transmission mechanism for tractors, the combination with a motor operated driving shaft and a driven shaft, of a friction clutch for connecting the same at will, transmission gears driven from said driven shaft, a pulley normally loose on said driven shaft, and means independent of said friction clutch, operative at will, for causing said pulley to rotate with said driven shaft.

2. A transmission mechanism for tractors, comprising a motor operated driving shaft, an axially alined driven shaft, a friction clutch for connecting said two shafts at will, transmission gears operated from said driven shaft, a pulley normally loose on said driven shaft, said driven shaft, at its projected end, having means for interlocking connection with a starting crank to start the motor and a positive clutch for connecting said pulley to said driven shaft at will.

3. In a tractor, the combination with an internal combustion engine, of an engine operated driving shaft, a driven shaft axially alined therewith, a friction clutch for connecting said two shafts at will, a pulley normally loose on said driven shaft, said driven shaft, at its projected end having means for application of a starting crank to start said engine, and a positive clutch for connecting said pulley to said driven shaft.

4. The combination with a driven shaft having a hub with a projecting lock flange, and the said shaft within said hub having means for interlocking connection with a starting crank, of a pulley normally free for rotation on said hub but held against axial movements in respect thereto, and a lock plunger seat for said pulley and engageable with the lock flange of said hub, whereby at will, said pulley may be locked for rotation with said driven shaft.

In testimony whereof I affix my signature in presence of two witnesses.

CHARLES H. STINSON.

Witnesses:
CLARA DEMAREST,
BERNICE G. WHEELER.

Copies of this patent may be obtained for five cents each, by addressing the "Commissioner of Patents, Washington, D. C."